Figure 1:
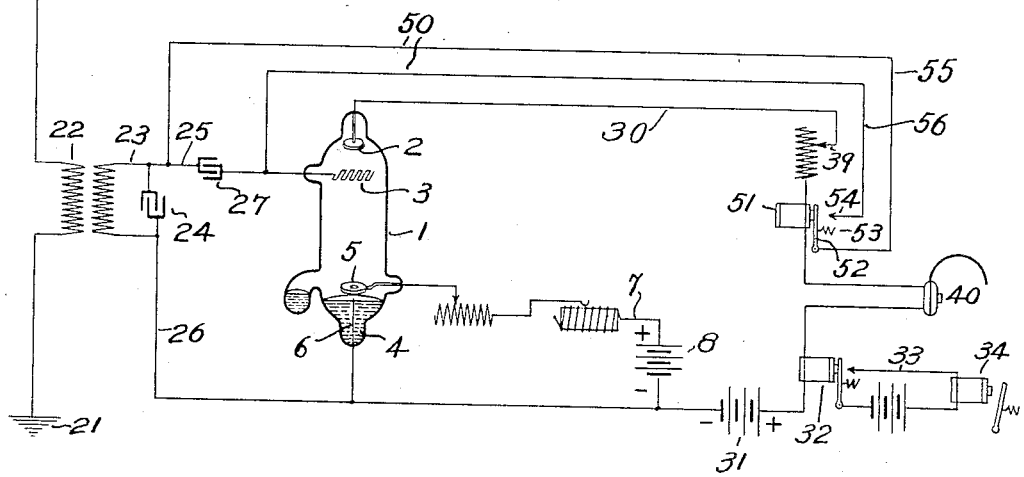

G. W. PIERCE.
APPARATUS FOR AMPLIFYING OR DETECTING ELECTRICAL VARIATIONS.
APPLICATION FILED MAR. 11, 1914.

1,127,371.

Patented Feb. 2, 1915.

Witnesses,
Geo. E. Stebbins.
Alice Ackroyd

Inventor:
George W. Pierce
by his attorneys
Phillips, Van Everen & Fish

UNITED STATES PATENT OFFICE.

GEORGE W. PIERCE, OF CAMBRIDGE, MASSACHUSETTS.

APPARATUS FOR AMPLIFYING OR DETECTING ELECTRICAL VARIATIONS.

1,127,371.     Specification of Letters Patent.     Patented Feb. 2, 1915.

Application filed March 11, 1914. Serial No. 824,034.

*To all whom it may concern:*

Be it known that I, GEORGE W. PIERCE, a citizen of the United States, residing at Cambridge, in the county of Middlesex and State of Massachusetts, have invented certain new and useful Improvements in Apparatus for Amplifying or Detecting Electrical Variations; and I do hereby declare the following to be a full, clear, and exact description of the invention, such as will enable others skilled in the art to which it appertains to make and use the same.

The present invention relates to an apparatus for amplifying or detecting electrical variations.

In the apparatus illustrated and described in my Patent No. 1,112,655, October 6, 1914, apparatus for receiving or relaying electric signals, and my Patent No. 1,112,549, October 6, 1914, apparatus for amplifying or detecting electrical variations, a body of gas in an evacuated tube is maintained in a sensitive conducting condition by means of an ionizing agency, such as a hot filament or a mercury arc. Associated with the ionizing agency are two electrodes. One electrode serves as an anode and is connected through a controlled circuit to the ionizing agency. The second electrode is an open-work electrode or screen and is interposed between the first electrode and the ionizing agency. The screen is connected by means of a controlling circuit to some point in the controlled circuit, either at the ionizing agency or at the anode. In the controlling circuit is a condenser which serves to insulate the screen from the controlled circuit. When electrical oscillations are impressed upon the controlling circuit, they pass through the condenser and cause oscillations of potential on the screen. There is apparently a rectifying action at the screen so that during the train of oscillations the screen acquires a negative charge. As pointed out in Patent No. 1,112,549, the apparatus is ordinarily adjusted to the intensity of the received impulses so that after the cessation of the train of received oscillations the screen loses its negative charge very rapidly, and the evacuated tube quickly recovers its normal conductivity. It is found however that, when the apparatus is adjusted so that it will be sensitive to feeble received oscillations, if stronger oscillations are impressed on the controlling circuit there will be an appreciable time lag before the tube recovers its normal conductivity. This is believed to be due to an accumulation of a sufficiently great negative charge on the screen and condenser caused by the rectification of the impressed oscillations, so that the charge is not dissipated from the screen for an appreciable time.

The apparatus of the present invention is an improvement on the apparatus described in said applications and is so constructed that the evacuated tube quickly recovers its normal conductivity after receiving a train of strong oscillations as well as after receiving a train of weaker oscillations. The present invention is however not limited to the type of detecting apparatus shown in said applications, but may be applied to other types of detecting apparatus in which there are accumulated electric charges which it is desirable to discharge.

Figure 2:
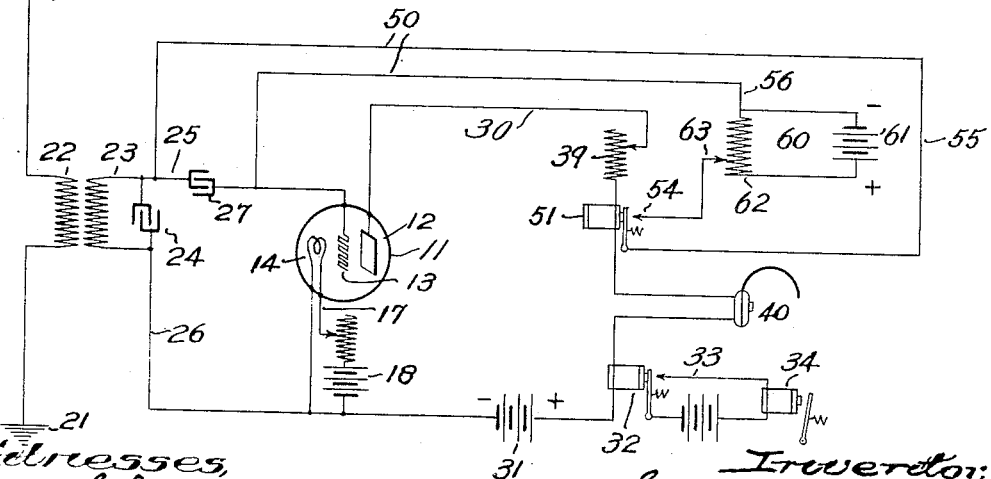

In the drawings which illustrate the preferred embodiment of the invention, Figure 1 is a diagrammatic view showing the apparatus of the present invention applied to an evacuated vessel which is ionized by means of mercury arc; and Fig. 2 is a diagrammatic view showing the apparatus of the present invention applied to an evacuated vessel ionized by means of an incandescent filament.

In Fig. 1, the means for maintaining the sensitive conducting gaseous space comprises an evacuated vessel or tube 1 in which are inclosed an electrode 2, an openwork electrode or screen 3, and an ionizing agency which consists of a body of mercury 4 and a perforated arc terminal plate 5. A platinum wire 6 extends through and just projects from the mercury and serves as an arc centering device. The mercury arc is maintained by means of a keep-alive circuit 7 which includes battery 8. This mercury vapor tube is substantially the same as that shown in my Patent No. 1,112,549 and my Patent Number 1,087,180.

In Fig. 2, the means for maintaining a sensitive conducting gaseous space comprises an evacuated vessel or tube 11 in which are inclosed an electrode 12, an openwork electrode or screen 13, and an ionizing agency which consists of an incandescent filament 14. The incandescent filament is heated by means of a local circuit 17 which includes a battery 18. The evacuated vessel is substantially the same in arrangement of its parts as the filament ionized evacuated vessels shown in Patent No. 1,112,655.

In both Figs. 1 and 2, 20 indicates the antenna of a wireless receiving system connected to ground at 21. Instead of the antenna circuit illustrated in the drawings, other signal receiving circuits may be employed, such for example, as those indicated in my prior applications referred to above. The antenna circuit is coupled by means of an oscillation transformer 22 to a closed high frequency oscillation circuit 23 which contains a condenser 24. Tapped from the oscillation circuit 23 on the opposite sides of the condenser 24 are receptor leads 25 and 26. The leads 25 and 26 and their connections with the receiving apparatus constitute what may be termed the "controlling" circuit by means of which the electric potential variations set up in the receiving apparatus by the received waves are impressed upon the sensitive conducting gas in the tube. The receptor lead 25 is connected to the open-work electrode or screen. The receptor lead 26 is connected to one of the leading-in wires of the ionizing means, the connection in Fig. 1 being to the platinum wire 6, the connection in Fig. 2 being to one of the wires of the filament-heating circuit 17. This forms a connection from the controlling circuit to the controlled circuit, which is hereinafter described. A condenser 27 is interposed in the controlling circuit, preferably in the lead 25, and serves as a stoppage condenser to insulate the open-work electrode or screen from the controlled circuit. An electric circuit 30, which is designated as the "controlled" circuit is connected between the electrode 2 in Fig. 1 or the electrode 12 in Fig. 2, and the ionizing agency. In the circuit 30 is a battery 31, the positive pole of which is connected to the electrode 2. The electrode 2 and the ionizing agency serve as the anode and cathode electrodes respectively of the controlled circuit 30. The circuit 30 may be provided with a ballast resistance 39. Included in the circuit 30 is a relay 32. The relay 32 operates upon the decrease in current in the circuit 30 to close the sounder circuit 33 and operate the telegraphic sounder 34. When the train of Hertzian waves strikes the antenna, the apparent conductivity of the vapor tube is decreased and cuts down the current in the controlled circuit 30 causing the sounder 34 to operate. The construction and arrangement of the parts just described are substantially like that of Patent No. 1,112,549 and a further detailed description is not necessary. The telephone receiver 40 is also included in the controlled circuit 30 and may be used for audibly detecting received messages which are too faint to operate the relay and sounder. The telephone receiver may be used for detecting all received signals in which case the relay 32 and sounder circuit 33 may be dispensed with.

The device for permitting a rapid recovery of the conductivity of the vapor tube after the reception of a train of strong oscillations, comprises a shunt circuit 50 connected around the condenser 27 and a relay 51 which operates to close the shunt circuit upon a sufficient decrease in the current of the controlled circuit 30. The relay 51 is connected directly in the circuit 30 and operates while the normal current is flowing in the circuit 30 to attract and hold its armature 51. When the current in the circuit 30 drops below a predetermined amount, the relay armature 52 is released and is drawn by its spring 53 against the contact point 54. The armature 52 is connected by one of the lead wires 55 of the shunt circuit 50 to one side of the condenser 27, and the contact point 54 is connected through the other lead wire 56 to the other side of the condenser 27. The moving parts of the relay 51 are light so that they operate very rapidly.

The amount of decrease in current in the controlled circuit 30 is apparently dependent upon the strength of the received oscillations impressed on the open-work electrode or screen. When the received oscillations are comparatively feeble, the vapor tube recovers its normal conductivity rapidly after the cessation of the train of oscillations, and there is therefore no need of discharging any charges accumulating on the open-work electrode or screen. The relay 51 may be inoperative on very weak signals, so that the shunt circuit 50 is not closed upon the comparatively small decrease in current in the controlled circuit 30 incident to the reception of feeble oscillations. The telephone receiver 40 does respond however, to such current decrease. However, when the received oscillations are comparatively strong, there is a greater decrease in the current in the controlled circuit 30 as well as a tendency for the tube to have an appreciable time lag in recovering its conductivity. This tendency is corrected by the relay 51 which short-circuits the condenser 27. When there are impressed on the tube received impulses sufficiently strong to cause an objectionable time lag in the recovery of the tube, the current in the circuit 30 is reduced below a predetermined amount and the relay 51 operates to close the shunt circuit 50. As soon as the shunt circuit 50 is closed the open-work electrode and the stoppage condenser are discharged and the tube immediately recovers its normal conductivity and the current in the circuit 30 momentarily rises and operates the relay 51 to open the shunt circuit 50, whereupon the screen accumulates another charge and apparent conductivity of the tube again is lowered until the relay 51 again operates to short-circuit the condenser 27. During the reception of a train of strong oscillations, the relay 51 is continually vibrating. The integrated or average current in the controlled circuit 30 is however sufficiently reduced so that the relay 32 closes the sounder circuit 33. The relay 32 may be slow in operation so that the sounder 34 does not rattle during the reception of a train of strong impulses, but if desired, the relay 32 and sounder 34 may be quick acting and produce an interrupted motion by which the message may be read or recorded.

In Fig. 2, a source of electro-motive force 60 is included in the lead 56 of the shunt circuit 50. The source of electro-motive force 60 includes a battery 61, a resistance 62, with which a movable contact point 63 in the circuit 50 is connected. By adjusting the contact point 63, the electro-motive force impressed on the shunt circuit 50 may be varied. The action of this electro-motive force is to prevent the open-work electrode 13 from being entirely discharged when the condenser 27 is short-circuited through the shunt circuit 50, and consequently prevents the resistance of the tube 11 from being as greatly reduced as is the case when the condenser 27 is short-circuited through a shunt circuit like that in Fig. 1. In some cases it is desirable to use the source of electro-motive force 60 because a greater reduction in the current of the controlled circuit 30 may be had when the relay 51 is operating.

By means of the present invention the apparatus operates to receive strong as well as feeble oscillations. The apparatus is adjusted for the feeble oscillations and then the tendency which the strong impulses would otherwise have to delay the recovery of the tube is automatically prevented by means of the current controlled relay and shunt circuit. This is of particular importance in wireless telegraphy where it may be desirable to pick up successively a number of sending stations, the received oscillations of which vary in intensity.

The available sensitiveness of the receiving apparatus is increased because the apparatus may be adjusted to its maximum sensitiveness for the reception of feeble signal impulses and this adjustment need not be disturbed if the impulses grow stronger or other strong impulses are to be received.

It will be noted that the device for discharging the charges accumulated on the condenser and open-work electrode by the rectifying action of the tube does not operate continuously but is initiated by the received signal impulses and ceases to operate after the received signal impulses cease.

The present invention is not limited in its application to the particular forms and arrangement of the means for maintaining the gaseous conducting space or the connections of the controlling and controlled circuits, neither is the present invention limited to the particular apparatus for securing the quick recovery of the tube, but may be embodied in other constructions within the scope of the invention as pointed out in the following claims:—

I claim—

1. An apparatus for amplifying or detecting electrical variations having, in combination, means for maintaining a sensitive conducting gaseous space, a plurality of electrodes in the space, a controlled electric circuit including a source of electrical energy connected between two of the electrodes, a controlling electric circuit including a condenser connected to an electrode other than the controlled circuit electrodes, and means controlled by the current in the controlled circuit for shunting the condenser.

2. An apparatus for amplifying or detecting electrical variations having, in combination, an evacuated vessel, an electrode in the vessel, an ionizing agency in the vessel, a controlled electric circuit connected between the ionizing agency and the electrode, means for impressing an electromotive force on the controlled circuit, a second electrode in the vessel, a controlling electric circuit connected with the second electrode and including a condenser, and means controlled by the current in the controlled circuit for shunting the condenser.

3. An apparatus for amplifying or detecting electrical variations having, in combination, means for maintaining a sensitive conducting gaseous space, a plurality of electrodes in the space, a controlled electric circuit connected between two of the electrodes, means for from time to time temporarily varying the apparent conductivity of the space including a controlling circuit connected to an electrode other than the controlled circuit electrodes, and means controlled by the current in the controlled circuit for discharging charges accumulated on the controlling circuit electrode.

4. An apparatus for amplifying or detecting electrical variations, having, in combination, an evacuated vessel, an electrode in the vessel, an ionizing agency in the vessel, a controlled electric circuit connected between the ionizing agency and the electrode, means for impressing an electromotive force on the controlled circuit, means for varying the apparent conductivity of the space between the ionizing agency and the first electrode including a second electrode in the vessel and a controlling circuit connected between the second electrode and the controlled circuit and including a condenser so as to insulate the second electrode from the controlled circuit, and means for automatically and quickly discharging electric charges accumulated on the second electrode.

5. An apparatus for amplifying or detecting electrical variations having, in combination, an evacuated vessel, an electrode in the vessel, an ionizing agency in the vessel, a controlled electric circuit connected between the ionizing agency and the electrode, means for impressing an electromotive force on the controlled circuit and acting normally to cause a current flow through the vessel between the ionizing agency and the electrode, means for from time to time temporarily decreasing the apparent conductivity of the space between the ionizing means and the electrode including a second electrode in the vessel and a controlled circuit including a condenser and connected to the second electrode, and means operating upon a decrease of the current in the controlled circuit below a predetermined amount for discharging electric charges accumulated on the second electrode.

6. An apparatus for amplifying or detecting electrical variations having, in combination, an evacuated vessel, an ionizing agency in the vessel, an electrode in the vessel, a controlled electric circuit connected between the ionizing agency and the electrode, means for impressing an electro-motive force on the controlled circuit and acting normally to cause a current flow through the vessel between the ionizing agency and the electrode, means for from time to time temporarily decreasing the apparent conductivity of the space between the ionizing agency and the electrode including a second electrode interposed between the ionizing agency and the first electrode and a controlling circuit connected between the second electrode and the controlled circuit, a condenser in the controlling circuit serving to insulate the second electrode from the controlled circuit, and current-operated means acting upon a decrease of the current in the controlled circuit below a predetermined amount to shunt the condenser.

7. An apparatus for amplifying or detecting electrical variations having, in combination, an evacuated vessel, an electrode in the vessel, an ionizing agency in the vessel, a controlled electric circuit connected between the ionizing agency and the electrode, means for impressing an electro-motive force on the controlled circuit, a second electrode in the vessel, a controlling electric circuit connected with the second electrode and including a condenser, and a relay for preventing the accumulation of too great an electric charge on the second electrode.

8. An apparatus for amplifying or detecting electrical variations having, in combination, means for maintaining a sensitive conducting gaseous space, a plurality of electrodes in the space, a controlled electric circuit connected between two of the electrodes, a controlling electric circuit connected to an electrode other than the controlled circuit electrodes and operating to cause the accumulation of an electrical charge on the controlling circuit electrode, and means external to the gaseous space for preventing the accumulation of too great an electric charge on the controlling circuit electrode.

9. An apparatus for amplifying or detecting electrical variations having, in combination, a high frequency circuit, a rectifying detector connected to said high frequency circuit through a stoppage condenser, a current source connected with the detector, and means operated by currents passed through the detector for discharging charges accumulated on the stoppage condenser.

10. An apparatus for amplifying or detecting electrical variations, having, in combination, a controlling circuit, a rectifying detector connected to said controlling circuit through a stoppage condenser, a current source connected with the detector, and means operated by currents passed through the detector for discharging charges accumulated on the stoppage condenser.

11. An apparatus for amplifying or detecting electrical variations having, in combination, a controlling circuit, a rectifying detector connected to said controlling circuit through a stoppage condenser, and means initiated by the received electrical variations for discharging charges accumulated on the stoppage condenser.

12. An apparatus for amplifying or detecting electrical variations having, in combination, a rectifying detector having a conductor which accumulates a rectified electric charge, and means initiated by the received electrical variations for discharging such accumulated charges.

GEORGE W. PIERCE.

Witnesses:
  GEORGE E. STEBBINS,
  ALICE ACKROYD.